A. Buzzell.
Carriage Spring.

No. 3,205. Reissued Nov. 24, 1868.

Witnesses.
J. M. Piper
J. R. Snow

Inventor.
A. Buzzell.
by his attorney
R. H. Eddy

United States Patent Office.

AZRO BUZZELL, OF WEST FAIRLEE, VERMONT.

*Letters Patent No.* 82,082, *dated September* 15, 1868; *reissue No.* 3,205, *dated November* 24, 1868.

IMPROVEMENT IN CARRIAGE-SPRINGS.

The Schedule referred to in these Letters Patent and making part of the same.

*To all persons to whom these presents may come:*

Be it known that I, AZRO BUZZELL, of West Fairlee, of the county of Orange, and State of Vermont, have invented a new and useful Improvement in Carriage-Springs; and do hereby declare the same to be fully described in the following specification, and represented in the accompanying drawings, of which—

Figure 1 denotes a side elevation, and

Figure 2, a longitudinal section of one of my improved springs and its axle-connection, the spring being exhibited as connected to a portion of a carriage-body.

Figure 1:
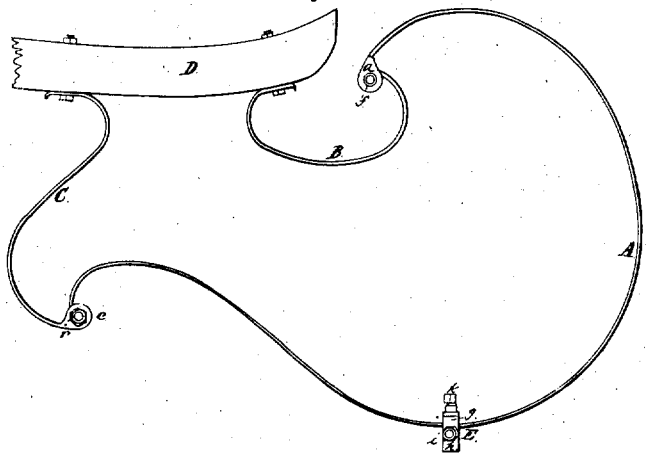
Figure 2:
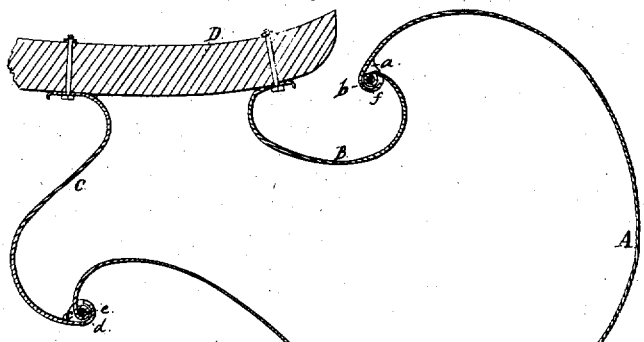
Figure 3:
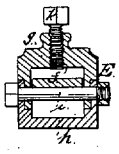
Figure 3 is a longitudinal section of the axle-connection.
Figure 4:
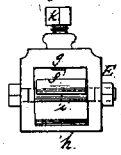
Figure 4 is a side or front view of it.

The spring in question is composed of one long S-spring, A, a short S-spring, C, and a C-spring, B, they being formed and arranged in manner as represented.

There is a pocket, *a*, at the upper end of the spring A, which receives the eye *b* at the outer end of the spring B, the said spring B, at its inner end, being bolted to the carriage-frame D.

The spring C, at its upper end, is also bolted to the carriage-frame, and at its lower end it has a pocket, *c*, to receive the eye *d* of the longest S-spring, the springs being connected by joint-pins *e f* going through the eyes and pockets.

The springs B and C have no connection between them, except it be the carriage-frame and the spring A, and, therefore, they are free to vibrate independently of each other, and in the direction of the length of the wagon or carriage-body. They support the spring A, which is arranged so as to vibrate vertically, as well as in other directions.

At its lowest part, the spring A goes through the axle-connection E, which consists of a saddle, *f*, and two yokes, *g h*, formed and arranged as shown in the drawings, and held together by a joint-pin, *i*.

The saddle rests on the joint-pin, and the spring is forced down upon the saddle by a clamp-screw, *k*, screwed through the upper yoke.

The lower yoke is to rest on the axle or the rocker-bar of the carriage, and is to be fastened thereto by a clasp.

In this way, the spring, when connected with the axle or rocker-bar, becomes pivoted or hinged thereto, so as to enable the spring to turn on the axle or rocker-bar.

This mode of connection of the spring with the axle or rocker-bar is very advantageous, particularly when the carriage-wheels may be crossing what are termed "water-bars," or transverse gulleys or grooves in a road.

The compound spring, composed of the three springs, formed and arranged as described, and disconnected in other respects than in being jointed together, and having the shorter springs B C bolted to the wagon and to the carriage-body, causes the carriage to run with great ease, particularly when going over a road having ruts or transverse gulleys, or "water-bars."

I am aware of the wagon-spring represented in the application of E. T. Jackman for a patent, (the said application having been filed in the Patent Office, January 31, 1861,) such spring consisting simply of two S-springs, connected at their ends, and provided with two curved supporters, extended from the upper of the said springs. This spring, although somewhat analogous to mine, differs from it, as my spring contains three separate springs, that is, two S-springs and one C-spring, connected only at one end of each, there being no connection, except the middle spring A, and the carriage-body, between the two end springs B C. This enables these latter springs to operate independently of one another, and to better advantage than they could were they connected by a bar or extension from each of them, going from one to the other of them.

I therefore claim my improved arrangement of the three springs A B C, as described, without any connection, extending from or about from the middle of one spring B to or about to that of the spring C, the whole being as shown in the drawings.

AZRO BUZZELL.

Witnesses:

SIDNEY P. BATES,

FRED. W. FARNHAM.